United States Patent [19]

Maarschalkerweerd

[11] Patent Number: 5,590,390
[45] Date of Patent: *Dec. 31, 1996

[54] FLUID TREATMENT SYSTEM AND PROCESS

[75] Inventor: Jan M. Maarschalkerweerd, Mount Brydges, Canada

[73] Assignee: Trojan Technologies Inc., London, Canada

[ * ] Notice: The term of this patent shall not extend beyond the expiration date of Pat. No. 5,418,370.

[21] Appl. No.: 318,858

[22] PCT Filed: Mar. 4, 1994

[86] PCT No.: PCT/CA94/00125

§ 371 Date: Oct. 17, 1994

§ 102(e) Date: Oct. 17, 1994

[87] PCT Pub. No.: WO94/20208

PCT Pub. Date: Sep. 15, 1994

Related U.S. Application Data

[63] Continuation-in-part of Ser. No. 26,572, Mar. 5, 1993, Pat. No. 5,418,370.

[51] Int. Cl.[6] .................................................. B01J 19/12
[52] U.S. Cl. .................. 422/186.3; 422/906; 422/24
[58] Field of Search ............................ 422/186.3, 906, 422/186.07, 24

[56] References Cited

U.S. PATENT DOCUMENTS

| | | | |
|---|---|---|---|
| 2,413,704 | 12/1944 | Glatthar et al. | 250/42 |
| 2,670,439 | 2/1954 | Darney | 250/43 |
| 3,061,721 | 10/1962 | Brenner | 250/431 |
| 3,140,054 | 4/1963 | Oharenko | 240/2.18 |
| 3,182,191 | 5/1965 | McFarland et al. | 250/43 |
| 3,182,193 | 5/1965 | Ellner et al. | 250/43.5 |
| 3,456,107 | 7/1969 | Robertson | 250/431 |
| 3,462,597 | 8/1969 | Young | 250/43 |
| 3,637,342 | 1/1972 | Veloz | 250/43 |
| 3,837,800 | 9/1974 | Wood | 210/64 |
| 3,924,139 | 12/1975 | Hirose et al. | 250/527 |
| 3,948,772 | 4/1976 | Ellner | 210/96 |
| 4,103,167 | 7/1978 | Ellner | 250/432 |
| 4,205,956 | 5/1980 | Flatow | 210/87 |
| 4,255,663 | 3/1981 | Lewis | 250/436 |
| 4,296,328 | 10/1981 | Regan | 250/436 |
| 4,367,410 | 1/1983 | Wood | 250/431 |
| 4,400,270 | 8/1983 | Hillman | 210/103 |
| 4,435,744 | 3/1984 | Russo | 362/219 |
| 4,467,206 | 8/1984 | Taylor et al. | 250/438 |
| 4,471,225 | 9/1984 | Hillman | 250/436 |
| 4,482,809 | 11/1984 | Maarschalkerweerd | 250/436 |
| 4,490,777 | 12/1984 | Tanner et al. | 362/221 |

(List continued on next page.)

FOREIGN PATENT DOCUMENTS

| | | |
|---|---|---|
| 421296 | 2/1911 | France . |
| 14626 | 1/1912 | France . |
| 434069 | 1/1912 | France . |
| 855521 | 11/1952 | Germany . |
| 2213658 | 10/1973 | Germany . |
| 3441535 | 6/1986 | Germany ............. C02F 1/32 |

OTHER PUBLICATIONS

Die Katadyn UV–Verfahrer zur Keimreduktior im Abwassen, Office National de la Propriete Industrielle, 1st Addition, Au Brevet d'invention Sketch of UVPS System Allegedly Installed In Lebanon, Mo. WWTP, Jul. 1988.

*Primary Examiner*—Charles T. Jordan
*Assistant Examiner*—Daniel Jenkins
*Attorney, Agent, or Firm*—Fitzpatrick, Cella Harper & Scinto

[57] ABSTRACT

A fluid treatment system includes one or more radiation sources arranged in an irradiation zone with a treatment zone through which fluid to be treated passes and is irradiated. The radiation zone has a closed cross section to maintain the fluid within a predetermined maximum distance form he radiation source. Preferably, the irradiation zone comprises a reduced cross-sectional area perpendicular to the direction of fluid flow and thus the fluid flow velocity is increased through the irradiation zone.

46 Claims, 8 Drawing Sheets

U.S. PATENT DOCUMENTS

| | | | |
|---|---|---|---|
| 4,535,247 | 8/1985 | Kurtz | 250/436 |
| 4,591,958 | 5/1986 | Lamboo | 362/219 |
| 4,596,935 | 6/1986 | Lumpp | 250/495.1 |
| 4,661,890 | 4/1987 | Watanabe et al. | 362/217 |
| 4,700,101 | 10/1987 | Ellner et al. | 313/1 |
| 4,755,292 | 7/1988 | Merriam | 210/192 |
| 4,757,205 | 7/1988 | Latel et al. | 250/435 |
| 4,767,932 | 8/1988 | Ellner | 250/435 |
| 4,872,980 | 10/1989 | Maarschalkerweerd | 210/243 |
| 4,897,246 | 1/1990 | Peterson | 422/186.3 |
| 4,952,376 | 8/1990 | Peterson | 422/186.3 |
| 4,968,489 | 11/1990 | Peterson | 422/186.3 |
| 5,006,244 | 4/1991 | Maarschalkerweerd | 210/243 |
| 5,019,256 | 5/1991 | Ifill et al. | 210/232 |
| 5,124,131 | 6/1992 | Wekhof | 422/186.3 |
| 5,227,140 | 7/1993 | Hager et al. | 250/432 R |
| 5,266,215 | 11/1993 | Engelhard | 210/748 |
| 5,418,370 | 5/1995 | Maarschalkerweerd | 2501/431 |

5,590,390

FLUID TREATMENT SYSTEM AND PROCESS

This application is a 371 of PCT/CA94/00125 filed 4 Mar. 1994 an is a continuation-in-part of Ser. No. 08/026,572, filed Mar. 5, 1993, now U.S. Pat. No. 5,418,370.

TECHNICAL FIELD

The present invention relates to a method of treating fluid by providing a gravity fed flow of fluid to an irradiation zone comprising at least one radiation source and having a closed cross-section which confines the flow of fluid within a predefined maximum distance from the at least one radiation source.

The present invention also relates to a novel method of cleaning a radiation source assembly located within a fluid flow wherein the exterior of the source is swept by a cleaning member containing an appropriate cleaning fluid.

The present invention also relates to a novel system for treating fluid by exposing it to radiation. Specifically, the present invention relates to a novel gravity fed system for treating fluids comprising a treatment zone which includes a irradiation zone configured to provide a fixed fluid geometry relative to the radiation sources.

The present invention also relates to a novel radiation source module for use in a fluid treatment system. Specifically, the module includes one or more radiation source assemblies connected to a support member and the support member is designed to permit insertion and extraction of the module from the treatment system while the system is in use. The module is designed such that the radiation source assembly is prevented from contacting surfaces within the treatment zone of the system while being installed or removed.

The present invention also relates to a novel cleaning apparatus for fluid treatment systems. Specifically, the cleaning apparatus includes one or more cleaning members which may be swept over the exterior of radiation source assemblies within the fluid treatment system, the cleaning members containing a suitable cleaning fluid which contacts the exterior of the radiation source assembly and loosens and/or removes materials fouling the exterior of the radiation source assembly.

BACKGROUND ART

Fluid treatment systems are known. For example, U.S. Pat. Nos. 4,482,809, 4,872,980 and 5,006,244 (assigned to the assignee of the present invention), the contents of each of which are hereby incorporated by reference, all describe gravity fed fluid treatment systems which employ ultraviolet (UV) radiation.

Such systems include an array of UV lamp frames which include several UV lamps each of which are mounted within sleeves extending between two support arms of the frames. The frames are immersed into the fluid to be treated which is then irradiated as required. The amount of radiation to which the fluid is exposed is determined by the proximity of the fluid to the lamps, the output wattage of the lamps and the fluid's flow rate past the lamps. One or more UV sensors may be employed to monitor the UV output of the lamps and the fluid level is typically controlled, to some extent, downstream of the treatment device by means of level gates or the like. Since, at higher flow rams, accurate fluid level control is difficult to achieve in gravity fed systems, fluctuations in fluid level are inevitable. Such fluctuations could lead to non-uniform irradiation in the treated fluid.

However, disadvantages exist with the above-described systems. Depending upon the quality of the fluid which is being treated, the sleeves surrounding the UV lamps periodically become fouled with foreign materials, inhibiting their ability to transmit UV radiation to the fluid. When fouled, at intervals which may be determined from historical operating data or by the measurements from the UV sensors, the sleeves must be manually cleaned to remove the fouling materials.

If the UV lamp frames are employed in an open, channel-like system, one or more of the frames may be removed while the system continues to operate, and the removed frames may be immersed in a bath of suitable acidic cleaning solution which is air-agitated to remove fouling materials. Of course, surplus or redundant sources of UV radiation must be provided (usually by including extra UV lamp frames) to ensure adequate irradiation of the fluid being treated while one or more of the frames has been removed for cleaning. Of course, this required surplus UV capacity adds to the expense of installing the treatment system.

Further, a cleaning vessel containing cleaning solution into which UV lamp frames may be placed must also be provided and maintained. Depending upon the number of frames to be cleaned at one time and the frequency at which they require cleaning, this can also significantly add to the expense of installing, maintaining and operating the treatment system.

If the frames are in a closed system, removal of the frames from the fluid for cleaning is usually impractical. In this case, the sleeves must be cleaned by suspending treatment of the fluid, shutting inlet and outlet valves to the treatment enclosure and filling the entire treatment enclosure with the acidic cleaning solution and air-agitating the fluid to remove the fouling materials. Cleaning such closed systems suffers from the disadvantages that the treatment system must be stopped while cleaning proceeds and that a large quantity of cleaning solution must be employed to fill the treatment enclosure. An additional problem exists in that handling large quantities of acidic cleaning fluid is hazardous and disposing of large quantities of used cleaning fluid is difficult and/or expensive. Of course open flow systems suffer from these two problems, albeit to a lesser degree.

Indeed, it is the belief of the present inventor that, once installed, one of the largest maintenance costs associated with prior art fluid treatment systems is often the cost of cleaning of the sleeves about the radiation sources.

Another disadvantage with the above-described prior art systems is the output of the UV lamps. Unfortunately, the UV lamps in the prior art systems were required to be about five feet in length to provide the necessary wattage of UV radiation. Accordingly, the UV lamps were relatively fragile and required support at each end of the lamp. This increased the capital cost of the system.

Further, due to the somewhat limited output wattage of the UV lamps in the prior art systems, a great number of lamps were often required. For example, certain prior art installations employ over 9,000 lamps. Such a high number of lamps adds to the above-mentioned costs in cleaning lamps as well as the cost of maintaining (replacing) the lamps.

DISCLOSURE OF THE INVENTION

It is an object of the present invention to provide a novel method of treating a fluid by irradiation which obviates or mitigates at least one of the above-mentioned disadvantages of the prior art.

It is a further object of the present invention to provide a novel fluid treatment system which obviates or mitigates at least one of the above-mentioned disadvantages of the prior art.

According to one aspect of the present invention, there is provided a method of treating a fluid comprising the steps of:

(i) providing a gravity fed flow of fluid to a fluid inlet;

(ii) feeding the flow of fluid from the fluid inlet to an irradiation zone comprising at least one radiation source and having a closed cross-section;

(iii) confining the flow of fluid within a predefined maximum distance from the at least one radiation source;

(iv) exposing the flow of fluid to radiation from the radiation source; and (v) feeding the flow of fluid from step (iv) to a fluid outlet.

According to another aspect of the present invention, there is provided a method of removal of fouling materials from a radiation source in situ in a fluid treatment system, comprising the steps of:

(i) providing a supply of a cleaning fluid to a cleaning chamber;

(ii) moving the cleaning chamber into contact with at least a portion of the radiation source for a predetermined time period, the cleaning chamber maintaining the cleaning fluid in contact with the portion; and (iii) removing the cleaning chamber from contact with the portion of the radiation source after the predetermined time period.

According to another aspect of the present invention, there is provided a gravity fed fluid treatment system comprising a fluid inlet, a fluid outlet, and an irradiation zone disposed between the fluid inlet and fluid outlet, the irradiation zone (i) including at least one radiation source and, (ii) having a closed cross-section to confine fluid to be treated within a predefined maximum distance from the at least one radiation source assembly.

Preferably, the irradiation zone is disposed within a fluid treatment zone including an inlet transition region and an outlet transition region. The inlet transition region receives the fluid flow from the fluid inlet and increases its velocity prior to entry thereof into the irradiation zone. The outlet transition region receives the fluid flow from the irradiation zone and decreases the velocity of the fluid flow prior to its entry into the fluid outlet. Thus, the fluid flow velocity is only elevated within the irradiation zone to reduce hydraulic head loss of the fluid flow through the system. It will be appreciated by those of skill in the art that one or both of the inlet transition region and the outlet transition region may comprise a tapered section (described in more detail hereinbelow). Alternatively, a "bell-mouth" shaped inlet and outlet may be utilized. In either case, the underlying result is a reduction in hydraulic head loss.

According to another aspect of the present invention, there is provided a radiation source module for use in a fluid treatment system comprising: a support member; at least one radiation source assembly extending from said support member; and fastening means to affix the radiation source module in the fluid treatment system.

According to yet another aspect of the present invention, there is provided a cleaning apparatus for a radiation source assembly in a fluid treatment system, comprising: a cleaning sleeve engaging a portion of the exterior said radiation source assembly and movable between a retracted position wherein a first portion of said radiation source is exposed to a flow of fluid to be treated and an extended position wherein said first portion of said radiation source assembly is completely or partially covered by said cleaning sleeve, said cleaning sleeve including a chamber in contact with said first portion of said radiation source assembly and being supplied with a cleaning solution suitable to remove undesired materials from said first portion.

According to another aspect of the invention, there is provided a radiation sensor assembly comprising: a sensor housing; a radiation transmissive means within said housing and including a portion to be exposed to a radiation source; a radiation sensor receiving radiation from said transmissive means; and means to remove materials fouling said portion.

As used herein, the term "gravity fed" encompasses systems wherein the hydraulic head of the fluid is obtained from changes in the altitude of the fluid. It will be understood that such systems comprise both systems which are naturally gravity fed and systems wherein the altitude of the fluid is altered via pumps or other mechanical means to provide a gravity feed.

BRIEF DESCRIPTION OF THE DRAWINGS

Embodiments of the present invention will be described with reference to the accompanying drawings, in which.

BEST MODE FOR CARRYING OUT THE INVENTION

Figure 1:
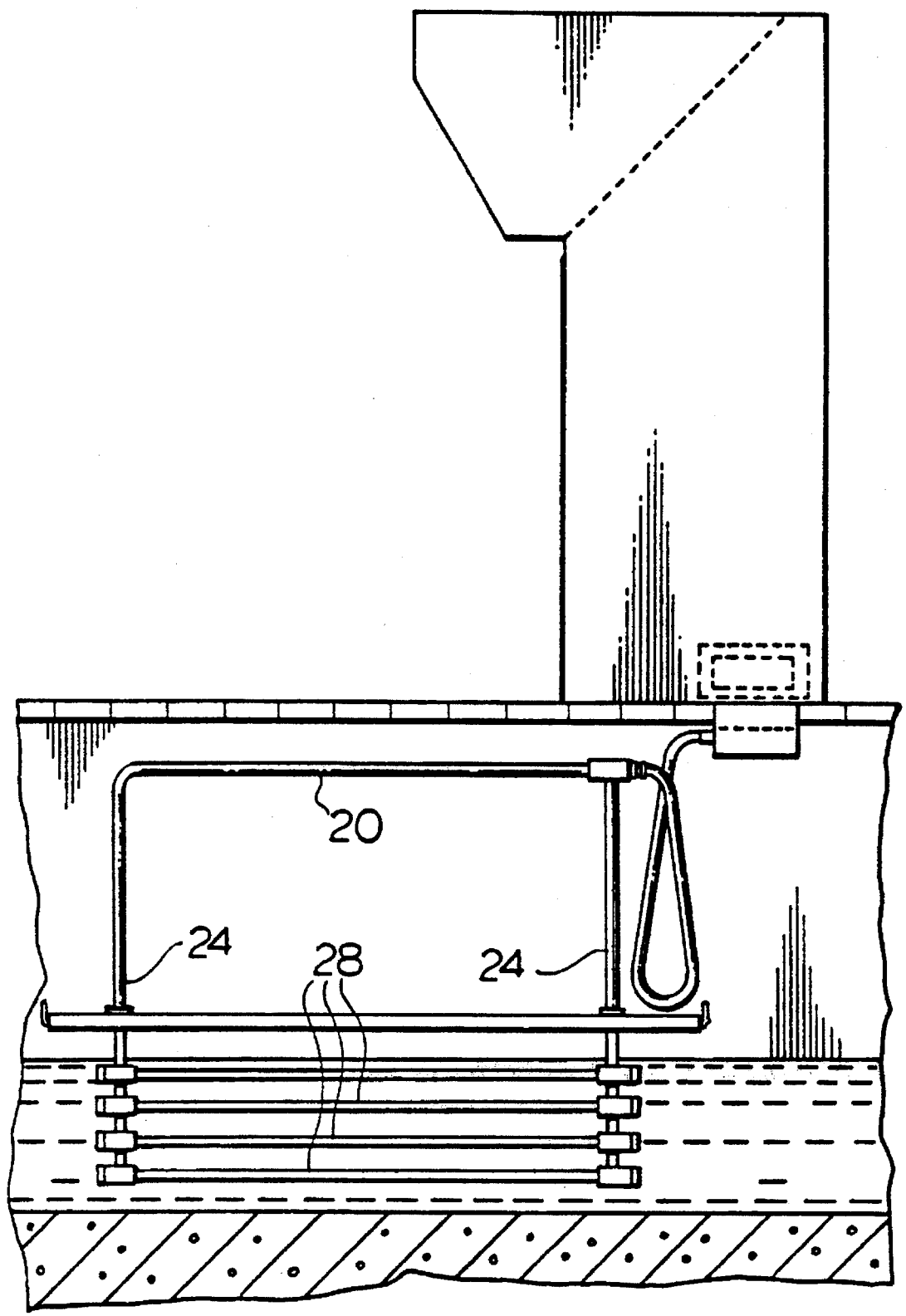
FIG. 1 illustrates a side section of a prior an fluid treatment device.
Figure 2:
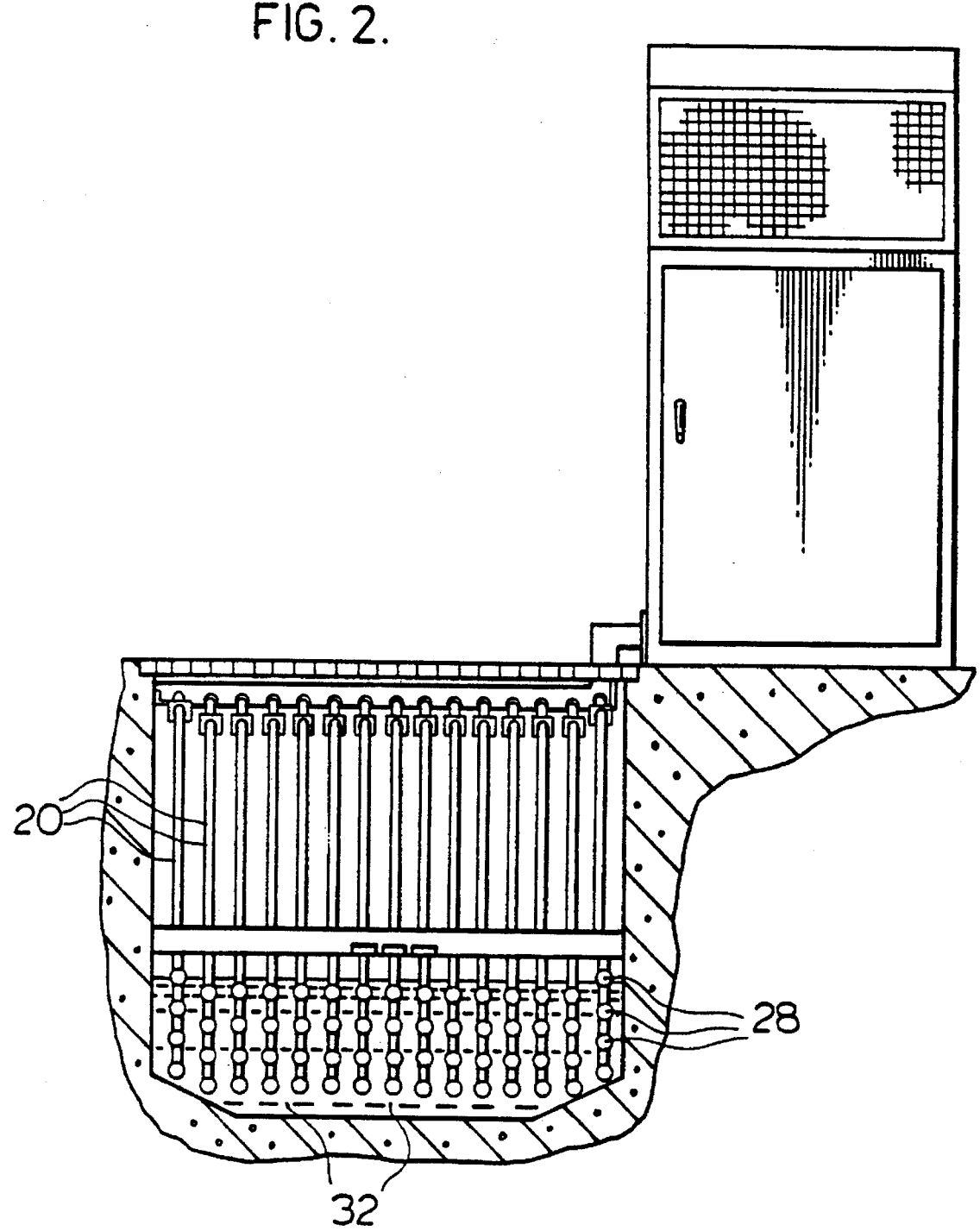
FIG. 2 illustrates an end section of the prior an fluid treatment device of FIG. 1.

For clarity, a brief description of a prior art fluid treatment device will be presented before discussing the present invention. FIGS. 1 and 2 show a prior art treatment device as described in U.S. Pat. No. 4,482,809. The device includes a plurality of radiation source modules 20, each including a pair of frame legs 24 with UV lamp assemblies 28 extending therebetween. As best shown in FIG. 2, a plurality of lamp modules 20 are arranged across a treatment canal 32 with a maximum spacing between lamp modules 20 which is designed to ensure that the fluid to be treated is irradiated with at least a predetermined minimum dosage of UV radiation.

While this system has been successful, as discussed above it suffers from disadvantages in that the arrangement of the lamp modules 20 makes maintenance of the device relatively labour intensive. Specifically, replacing lamps or cleaning the sleeves surrounding the lamps is time consuming and expensive. Also, for treatment to continue when a lamp module is removed, it is necessary to provide redundant lamp modules to ensure that the fluid still receives the predefined minimum dosage of radiation increasing the cost of the system. Further, depending on the quality of the fluid and its flow rate, significant numbers of lamps and sleeves may be required per unit of fluid treated. Another disadvantage of this prior art system is the difficulty in controlling fluid level relative to lamp modules 20 at higher flow rates.

Accordingly, while the above-described prior an systems have been successful, the present inventor has been concerned with improving fluid treatment systems to overcome some of these disadvantages. The present invention will now be described with reference to the remaining Figures.

Figure 3:
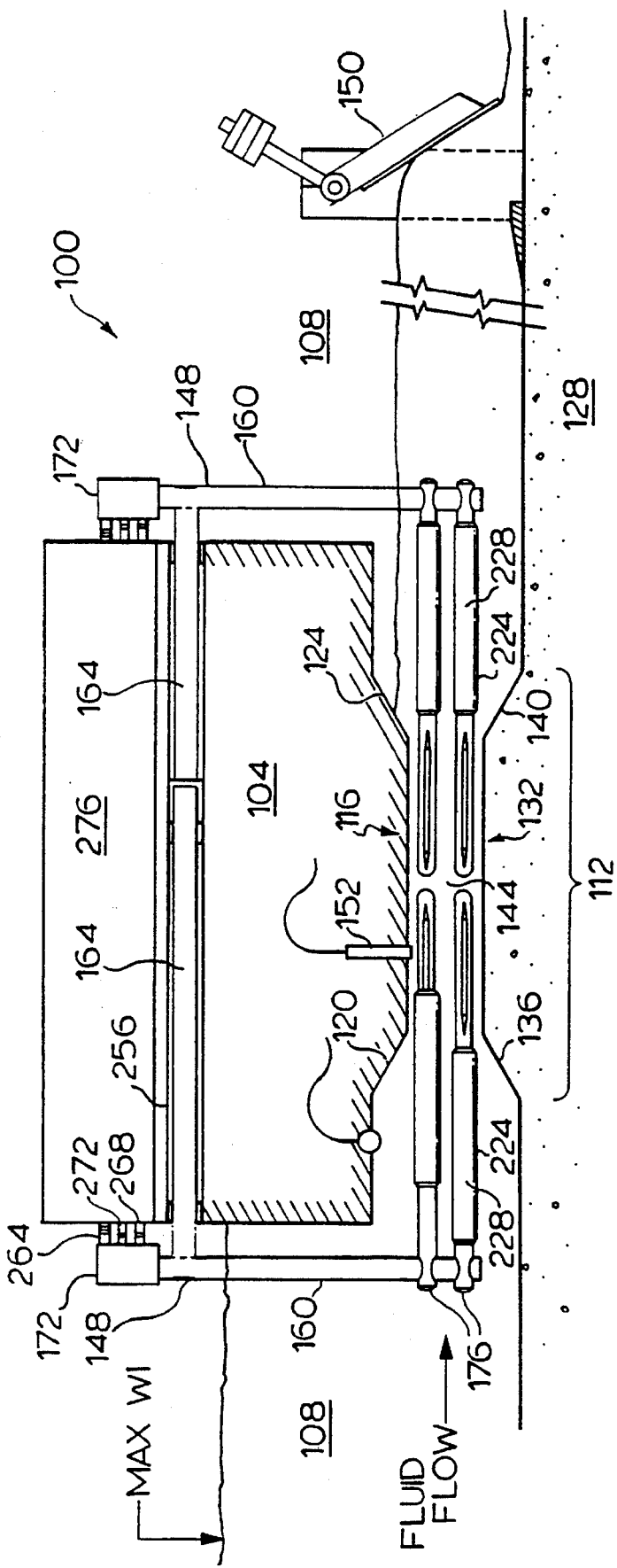
FIG. 3 illustrates a side section of a first embodiment of a horizontal fluid treatment system in accordance with the present invention.

Referring now to FIG. 3, a fluid treatment system in accordance with the present invention is indicated generally at 100. The system 100 includes a main body 104 which is installed across an open fluid canal 108 such that the all of the fluid flow through canal 108 is directed through a treatment zone 112. Main body 104 may be precast concrete, stainless steel or any other material suitable for use with the fluid to be treated and which is resistant to the type of radiation employed.

The lower surface of main body 104 includes a central section 116 which extends downward with leading and trailing inclined sections 120 and 124, respectively. A corresponding upraised central section 132 is located on a base 128 of canal 108 beneath central section 116 and includes leading and trailing inclined sections 136 and 140, respectively. Central section 132 may be part of main body 104 or may be part of base 128 (as illustrated).

As can be clearly seen in FIG. 3, sections 116 and 132 form a narrowed irradiation zone 144, while sections 120 and 136 form a tapered inlet transition region and sections 124 and 140 form a tapered outlet transition region.

As will be apparent, irradiation zone 144 presents a closed cross-section to the fluid to be treated. This provides a fixed geometry of the fluid relative to irradiation sources (described hereinafter) to ensure that the fluid is exposed to the predefined minimum radiation from the irradiation sources. Those of skill in the art will appreciate that the inner walls of irradiation zone 144 could be designed and configured to substantially follow the contours of the portions of radiation source modules 148 disposed therein in order to maximize treatment efficiency at the farthest points from the radiation source.

At least one of the upstream and downstream faces of main body 104 includes one or more radiation source modules 148 mounted thereto. Depending on the fluid to be treated, the number of modules 148 provided may be varied from a single upstream module 148 to two or more modules 148 across both the upstream and downstream faces of main body 104.

Preferably, main body 104 further includes a radiation sensor 152 which extends into irradiation zone 144 and a fluid level sensor 156 which monitors the level of fluid in the inlet side of treatment zone 112. As is known to those of skill in the art, if the level of fluid in the system falls below fluid level sensor 156, an alarm or shutdown of the radiation sources will occur, as appropriate. A standard fluid levelling gate 150 is also provided downstream of main body 104 to maintain a minimum fluid level in treatment zone 112.

Figure 4:
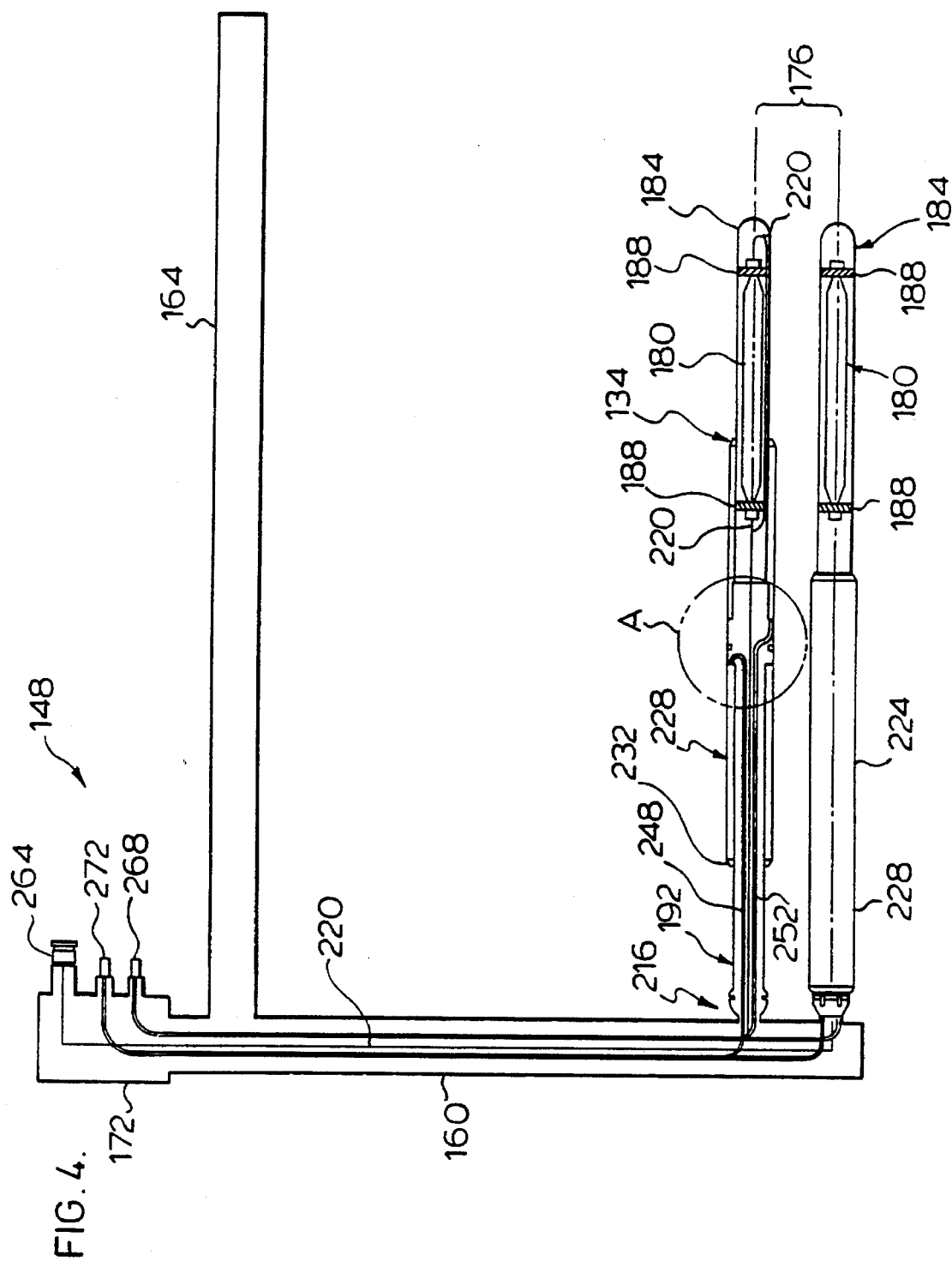
FIG. 4 illustrates a radiation source module for use with the system of FIG. 3.
Figure 5:
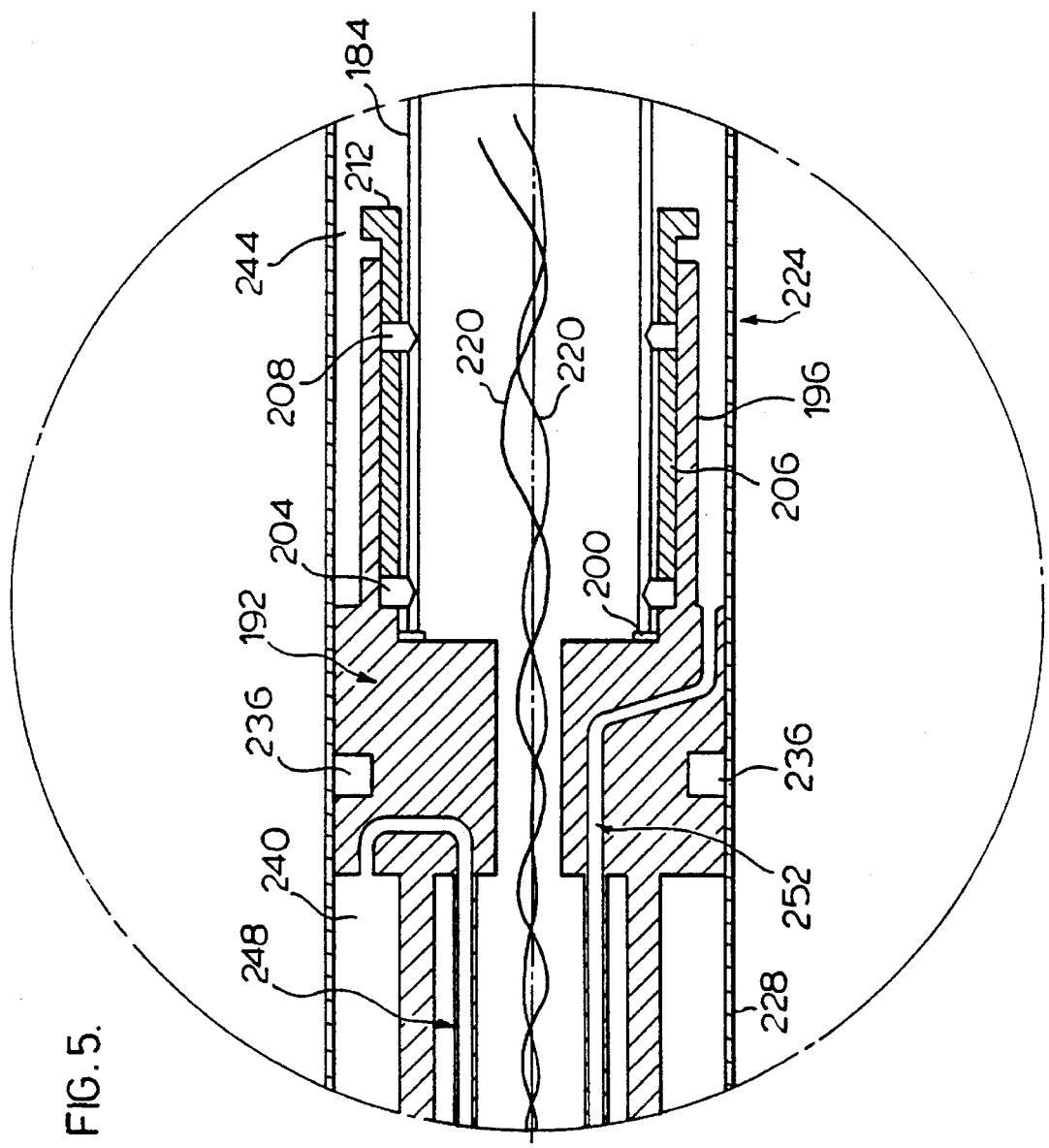
FIG. 5 illustrates an expanded view of the area indicated at A in FIG. 4.

As best shown in FIGS. 4 and 5, each radiation source module 148 includes a radiation source support leg 160, a horizontal support and guide member 164 (optional), a connector box 172 and one or more radiation source assemblies 176 adjacent the lower extremity of support leg 160. Each radiation source assembly 176 includes a high intensity radiation source 180 which is mounted within a hollow sleeve 184 by two annular inserts 188. Of course, it will be apparent to those of skill in the art that in some circumstances radiation sources assemblies 176 will not require a sleeve and radiation source 180 may be placed directly in the fluid to be treated.

Each sleeve 184 is closed at the end distal support leg 160 and is hermetically joined to a mounting tube 192 connected to support leg 160. The hermetic seal between sleeve 184 and mounting tube 192 is accomplished by inserting the open end of sleeve 184 into a mount 196 which is hermetically fastened to the end of mounting tube 192. A rubber washer-type stopper 200 is provided at the base of mount 196 to prevent sleeve 184 from breaking due to it directly contacting housing 196 as it is inserted. A pair of O-ring seals 204, 208 are placed about the exterior of sleeve 184 with an annular spacer 206 between them.

After sleeve 184, O-ring seals 204, 208 and annular spacer 206 are inserted into mount 196, an annular threaded screw 212 is placed about the exterior of sleeve 184 and is pressed into contact with mount 196. The threads on screw 212 engage complementary threads on the interior of mount 196 and screw 212 is tightened to compress rubber stopper 200 and O-ring seals 204 and 208, thus providing the desired hermetic seal.

The opposite end of each mounting tube 192 is also threaded and is mated to a screw mount 216 which is in turn welded to support leg 160. The connections between mounting tube 192 and screw mount 216 and between screw mount 216 and support leg 160 are also hermetic thus preventing the ingress of fluid into the hollow interior of mounting tube 192 or support leg 160.

Each radiation source 180 is connected between a pair of electrical supply conductors 220 which run from connector box 172 to radiation source 180 through the inside of support leg 160 and mounting tube 192.

As best shown in FIGS. 4 and 5, a cleaning assembly 224 is also included on each radiation source assembly 176 and mounting tube 192. Each cleaning assembly 224 comprises a cylindrical sleeve 228 which acts as a double-action cylinder. Cylindrical sleeve 228 includes an annular seal 232, 234 at each end of the sleeve. Seal 232, which is adjacent support leg 160, engages the exterior surface of mounting tube 192 while seal 234, which is distal support leg 160, engages the exterior surface of radiation source assemblies 176.

The exterior of mount 196 includes a groove in which an O-ring seal 236 is placed. O-ring seal 236 engages the inner surface of cylindrical sleeve 228 and divides the interior of cylindrical sleeve 228 into two chambers 240 and 244. Chamber 240 is connected to conduit 248 and chamber 244 is connected to conduit 252. Each of conduits 248 and 252 run from connector box 172, through the interior of support leg 160 and through the interior of mounting tube 192, to mount 196 where they connect to chambers 240 and 244, respectively.

As will be readily understood by those of skill in the art, by supplying pressurized hydraulic oil, air or any suitable fluid to chamber 240 through conduit 248, cylindrical sleeve 228 will be urged toward support leg 160 and will force fluid out of chamber 244 and into conduit 252. Similarly, by supplying pressurized fluid to chamber 244 through conduit 252, cylindrical sleeve 228 will be urged toward sleeve 184 and will force fluid out of chamber 240 and into conduit 248.

Conduit 252 is connected to a supply of an appropriate cleaning solution, such as an acidic solution, and conduit 248 is connected to a supply of any suitable fluid, such as air. Thus, when it is desired to clean the exterior of sleeve 184, pressurized cleaning solution is supplied to chamber 244 while fluid is removed from chamber 240. Cylindrical sleeve 228 is thus forced to an extended position distal from support leg 160 and, as cylindrical sleeve 228 moves to its extended position, seal 234 could also sweep loose foreign materials from sleeve 184.

When the cylindrical sleeve 228 is in its extended position, the cleaning solution in chamber 244 is brought into contact with the exterior of radiation assemblies 176, which forms the interior wall of chamber 244, and the cleaning solution chemically decomposes and/or removes the remaining foreign materials which are fouling radiation assemblies 176. After a preselected cleaning period, fluid is forced into chamber 240, the pressure on the cleaning solution is removed from chamber 244 thus forcing cylindrical sleeve 228 to a retracted position adjacent support leg 160. As cylindrical sleeve 228 is retracted, seal 234 again could sweep loosened foreign materials from the surface of radiation assemblies 176.

As will be understood by those of skill in the art, the above-described cleaning assembly 224 may be operated on a regular timed interval, for example once a day or, where the quality of the fluid being treated varies, in response to variations in the readings obtained from radiation sensor 152.

Each radiation source module 148 can be mounted to main body 104 by horizontal support member 164 which has a predefined cross-sectional shape and which is received in a complementary-shaped bore 256 in main body 104. The predefined shape is selected to allow easy insertion of horizontal support member 164 into bore 256 while preventing rotation of horizontal support member 164 within bore 256.

As can been seen in FIGS. 3 and 4, the length of horizontal support member 164 is selected such that horizontal support member 164 extends from support leg 160 to a greater extent than does radiation source assembly 176. In this manner, radiation source assembly 176 is maintained well clear of the inlet or outlet transition regions as the radiation source module 148 is being installed. This arrangement mimimizes the possibility of damage occurring to the radiation source assembly 176 from impacting it against other objects while installing radiation source module 148 and this is especially true if fluid is flowing through system 100. Due to the resulting required length of horizontal supports 164, bores 256 are horizontally staggered on opposite faces of main body 104.

When horizontal support member 164 is fully seated within bore 256, electrical power connectors 264, cleaning solution connectors 268 and fluid connectors 272 on connection box 172 are brought into engagement with complementary connectors on an enclosure 276. The engagement of connectors 264 and 272 with the complementary connectors on enclosure 276 also serves to maintain horizontal support member 164 within bore 256. Enclosure 276 may conveniently contain ballasts to supply electrical power for radiation sources 180 and pumps and storage vessels (not shown) for cleaning fluid and pressurized fluid for cleaning assemblies 224.

Recent improvements in radiation source technology have now made radiation sources of greater intensity available and devices which are filamentless are available. In comparison, prior art UV lamps employed in fluid treatment systems had rated outputs in the order of 1 watt per inch and were five feet in length.

As these greater intensity radiation sources emit more radiation, fewer radiation sources are needed to treat a given amount of fluid. As is known to those of skill in the art, the dosage of radiation received by the fluid is the product of the radiation intensity and the exposure time. The intensity of the radiation varies with the square of the distance the radiation passes through, but the exposure time varies linearly with the fluid flow velocity. Accordingly, it is desired to maintain the fluid to be treated as close as possible to the radiation sources. This requires either many low intensity radiation sources arranged within a large treatment area or fewer high intensity radiation sources arranged within a smaller treatment area. For reasons of efficiency, minimizing expense and for mitigating the above-mentioned requirement of accurately controlling fluid level, the latter alternative has been adopted by the present inventor as described above. Irradiation zone 144 is designed to present a closed cross-section to the fluid flow thereby ensuring that the fluid to be treated passes within a predetermined maximum distance of a minimum number of high intensity radiation sources 180. The flow rate of fluid through irradiation zone 144 can be increased so that an acceptable rate of fluid treatment is maintained with a minimum number of high intensity radiation sources.

Thus, the present system has been designed to minimize the size of irradiation zone 144 while elevating the fluid flow velocity to obtain the desired rate of treatment. Thus, the flow rate through irradiation zone 144 is higher than in prior an treatment devices which are typically designed to operate at flow rates of 2 feet per second or less. In contrast, the present system may be operated at a flow rate through irradiation zone 144 of up to 12 feet per second.

As is known to those of skill in the art, pressure head losses through a fluid conduit are a function of the square of the fluid flow velocity. Thus, high flow velocities result in increased head loss and may result in unacceptable fluctuations in the fluid level in the treatment system. Accordingly, the present system may be provided with inlets and outlets having large cross-sections to minimize head losses and to facilitate insertion and removal of radiation source modules as will be discussed below. The actual irradiation zone 144 is a relatively short length of reduced cross-section and is connected to the inlets and outlets by respective transition regions. In this manner, a desired relatively high flow rate through the irradiation zone 144 may be accomplished and hydraulic head losses minimized.

Other advantages provided by the present invention include simplified maintenance, as the radiation source assemblies may be cleaned of fouling materials in situ, and relatively easy removal of radiation source modules for maintenance or radiation source replacement. Further, the capability of in situ cleaning minimizes or eliminates the requirement for otherwise redundant radiation sources to be provided to replace those removed for cleaning and it is contemplated that the elevated velocity of the fluid through the irradiation zone will reduce the mount of fouling materials which adhere to the radiation sources.

Figure 6:
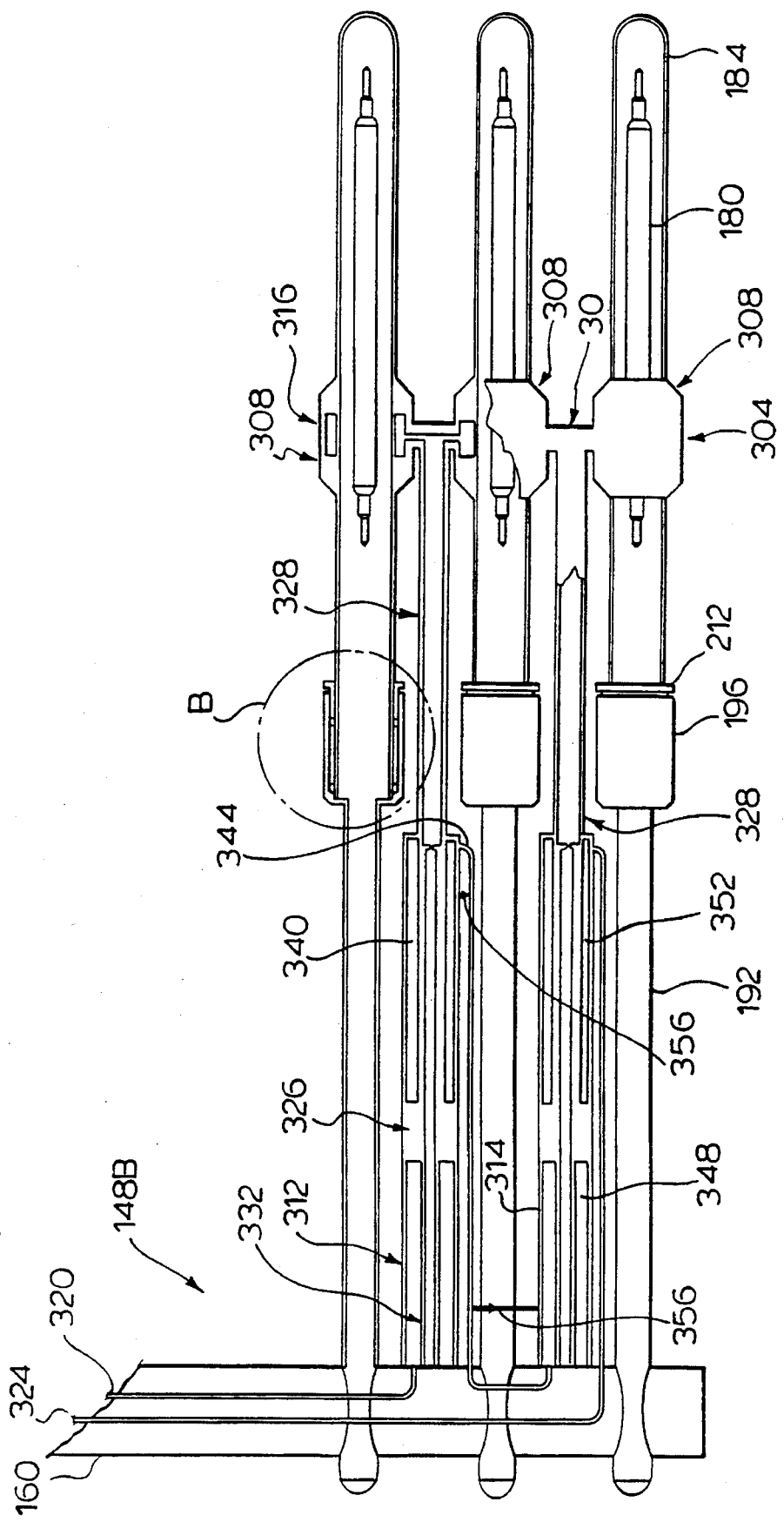
FIG. 6 illustrates a portion of another embodiment of a radiation source module for use with the system of FIG. 3.
Figure 7:
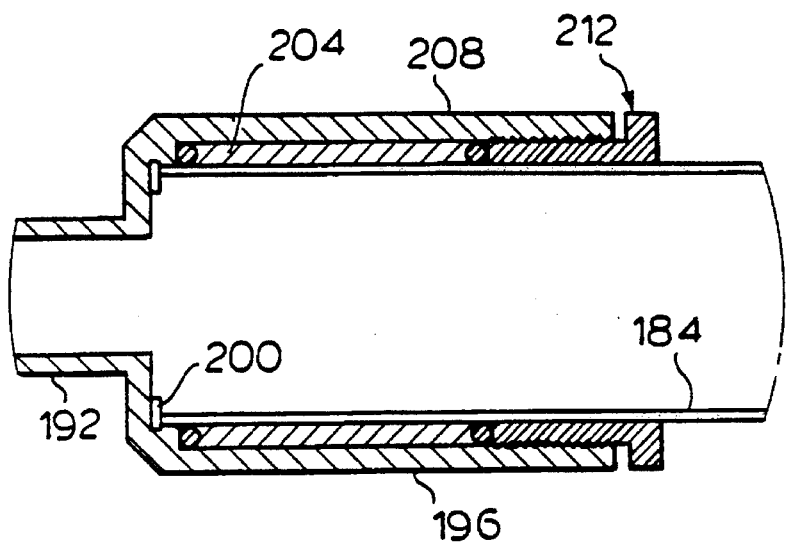
FIG. 7 illustrates an expanded view of the area indicated at B in FIG. 6.

Another embodiment of a radiation source module 148B and a cleaning assembly 300 is shown in FIGS. 6 and 7 wherein like components of the previous embodiment are identified with like reference numerals. As most clearly shown in FIG. 7, sleeve 184 is hermetically sealed to mounting tube 192 at housing 196 in a manner very similar to the embodiment shown in FIG. 5. However, in this embodiment cleaning assembly 300 comprises a web 304 of cleaning rings 308 and a pair of double-action cylinders 312,314. Each cleaning ring 308 includes an annular chamber 316 adjacent the surface of sleeve 184 and cleaning rings 308 are swept over sleeves 184 by the movement of cylinders 312,314 between retracted and extended positions.

As with the embodiment shown in FIG. 4, conduits 320 and 324 run from connector box 172 (not shown) through support leg 160 to cylinders 312 and 314 respectively. When fluid is supplied under pressure through conduit 320 to cylinder 312, the cylinder's piston rod 328 is forced out to its extended position. As will be understood by those of skill in the art, as piston rod 328 is extended by the supply of fluid to the chamber 332 on one side of the piston 336, fluid is forced out of the chamber 340 on the second side of the piston 336 and passes through connector link 344 to chamber 348 of cylinder 314 forcing its piston rod 328 to also extend and the fluid in chamber 352 to be forced into conduit 324.

In order to ensure that piston rods 328 travel synchronously, cylinders 312 and 314 are designed such that the volume of fluid displaced per unit of stroke of piston 336 in cylinder 3 12 is equal to the volume of fluid received per unit of stroke of piston 336 in cylinder 314. As will be understood by those of skill in the art, this is accomplished by selecting appropriate diameters for each of the two cylinders or the cylinder rods. As will be further understood by those of skill in the art, an one way compensator valve 356 is employed at the end of the extended stroke of the pistons 336 to further compensate for the any difference in the total volume of fluid which may result between chambers 332 and 352 and between chambers 348 and 340.

In a similar fashion, to retract piston rods 328, pressurized fluid is supplied to conduit 324 and a second compensator valve 356 is employed to compensate for the any difference in the total volume of fluid which may result between chambers 332 and 352 and between chambers 348 and 340 at the end of the retraction stroke.

It is contemplated that annular chambers 316 will be filled with a predetermined quantity of suitable cleaning fluid which could be changed at appropriate maintenance intervals, such as when servicing the radiation sources. Alternatively, annular chambers 316 could be supplied with cleaning solution via conduits run through the hollow center of piston rods 328. Another alternative is to provide annular chambers 316 in a sealed configuration to contain cleaning fluid which can be replaced when necessary. Further, the cleaning solution could be circulated through hollow piston rods 328, chamber 332 and annular chambers 316. By providing appropriate baffling means (not shown) within annular chambers 316, the cleaning fluid could enter through the lowermost hollow piston rod 328, circulate through cleaning rings 308 and exit through uppermost hollow piston rod 328.

While FIGS. 4, 5 and 6 illustrate specific embodiments of the aspect of the invention relating to cleaning apparatus for a radiation source assembly, other designs will be apparent to those of skill in the art without departing from the spirit of the invention.

For example, it is possible to employ a single, double-action cylinder in combination with a hollow cylinder rod that is very rigidly mounted through its cylinder rods on a plurality (e.g. 2 or 4) of cleaning rings 308. Further, it is possible to pump cleaning fluid (e.g. water) through hollow piston rods toward and into annular chambers 316 while moving the cylinder back and forth. If annular chambers 316 were outfitted with suitable spray nozzles or the like, it would be possible to apply a spray or jet stream across the surface of the irradiation chamber thereby facilitating cleaning of sleeve 184 of the radiation source.

Another design modification involves prefilling annular chambers 316 with a suitable cleaning fluid and modifying the chambers to provide a closed wiping assembly. This would allow for the use of various translation means to move the annular chambers 316 back and forth over sleeve 184 of the radiation source. For example, it is possible to utilize a double-acting, single cylinder that merely translates annular chambers 316 back and forth over sleeve 184 of radiation source. Of course it will be apparent to those of skill in the art that the annular chambers should be mounted rigidly to the translation means to avoid jamming of the entire assembly resulting in damage to sleeve 184.

As will be further apparent to those skilled in the art, in the embodiments described above, it is possible to reverse relative movement between the radiation source and the cleaning mechanism. Thus, the cleaning mechanism could be mounted rigidly with the treatment zone in the present or any other system, and the radiation source would be translated back and forth with respect thereto.

Figure 8:
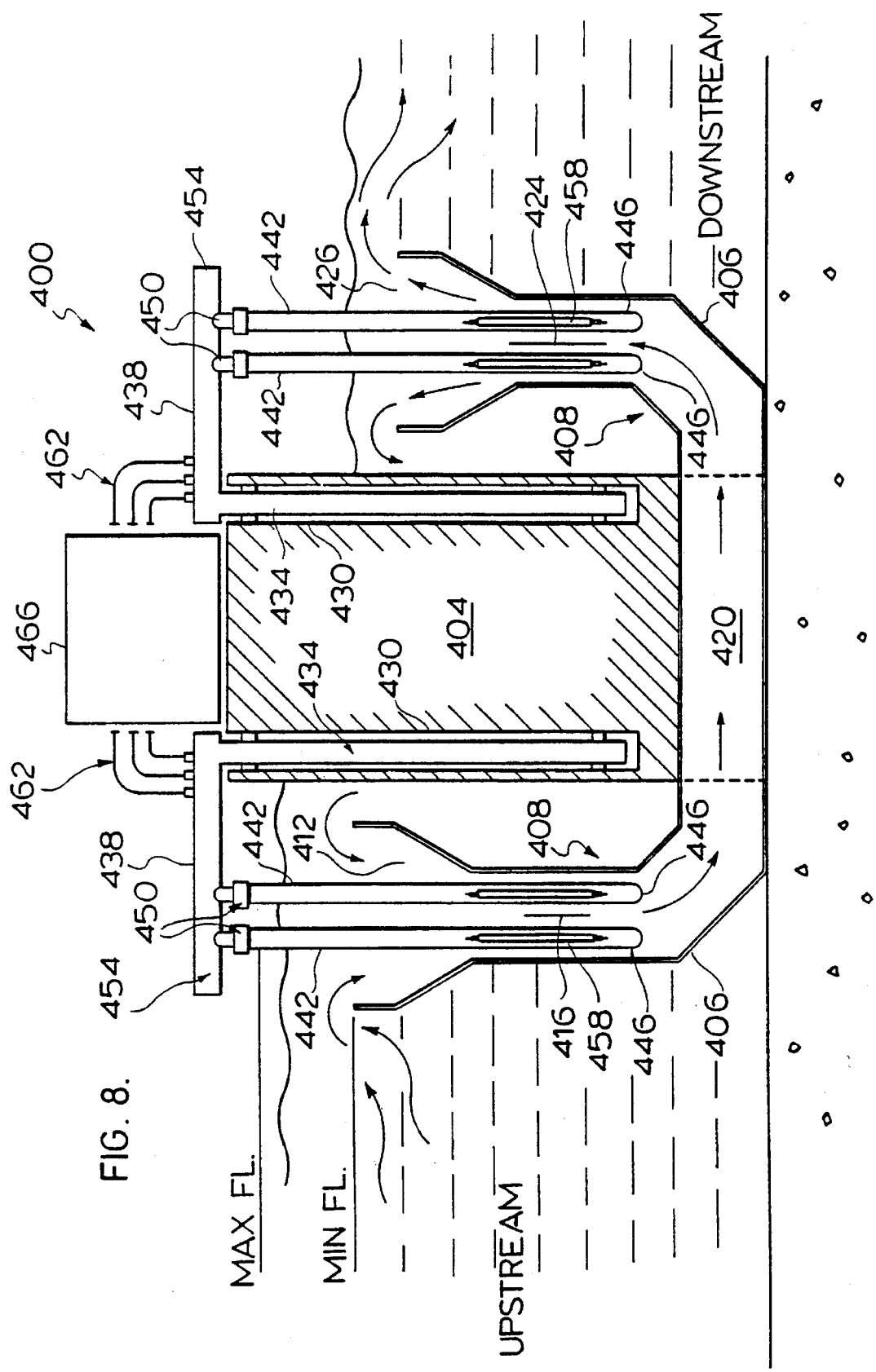
FIG. 8 illustrates a side section of a second embodiment of a vertical fluid treatment system in accordance with the present invention.

Another preferred embodiment of the present invention is shown in FIG. 8. In this embodiment a treatment system 400 includes a main body 404 with a lower surface which, with a base wall 406, defines a treatment zone 408. Treatment zone 408 comprises an inlet transition region 412, a first irradiation zone 416, an intermediate zone 420, a second irradiation zone 424 and a tapered outlet zone 426. As is apparent from the Figure, outlet zone 426 is lower than inlet zone 412 to provide some additional hydraulic head to the fluid being treated to offset that lost as the fluid flows through the treatment system. It will be apparent to those of skill in the art that, in this configuration, the requirement for level controlling gates and the like is removed as the treatment zone 408 also performs this function through the positioning of its inlet and outlet.

Main body 404 could also include bores 430 to receive vertical support members 434 of radiation source modules 438. Radiation source modules 438 are similar to the above described radiation source modules 148 but are configured for vertical positioning of the radiation source assemblies 442. Radiation source assemblies 442 include sleeves 446 which are connected to mount stubs 450. Of course, as mentioned above, it will be understood that in some circumstances the radiation source assemblies 442 will not require a sleeve and may instead be placed directly in the fluid to be treated.

As mount stubs 450 are located above the maximum level of fluid in treatment system 400, the connection to sleeves 446 need not be hermetically sealed and may be accomplished in any convenient fashion. Of course, as the connection point between sleeves and mount stubs 450 is above the level of fluid within the system, the interior of sleeves 446 will not be exposed to fluid.

Mount stubs 450 are in turn connected to support arms 454 which are attached to vertical support members 434. Radiation sources 458 are located within sleeves 446 and are connected between electrical supply lines (not shown) which are run from connectors 462, through hollow support arms 454 and mount stubs 450 and into sleeve 446. Connectors 462 connect with complementary connectors on enclosure 466 which may include a suitable power supply and/or control means for proper operation of the radiation sources 180 and cleaning supply systems, if installed.

In this embodiment, service of radiation source modules 438 is accomplished by lifting the radiation source modules 438 vertically to remove them from the fluid flow. While not illustrated in FIG. 8, it is contemplated that in some circumstances the cleaning assemblies described above will be desired and it will be apparent to those of skill in the art that either of the cleaning assembly embodiments described herein, or their equivalents, can be favourably employed with this embodiment of the present invention. Alternatively, it is contemplated that when the sleeves 446 require cleaning, a radiation source module may simply be removed by lifting it vertically.

As described above, fluid treatment systems typically include a radiation sensor 152 to monitor the intensity of radiation within an irradiation zone. These sensors include a radiation transmissive window behind which the sensor proper is mounted and the window is inserted into the fluid flow. Of course, as with radiation source assemblies 176 (442), this window becomes fouled over time.

Figure 9:
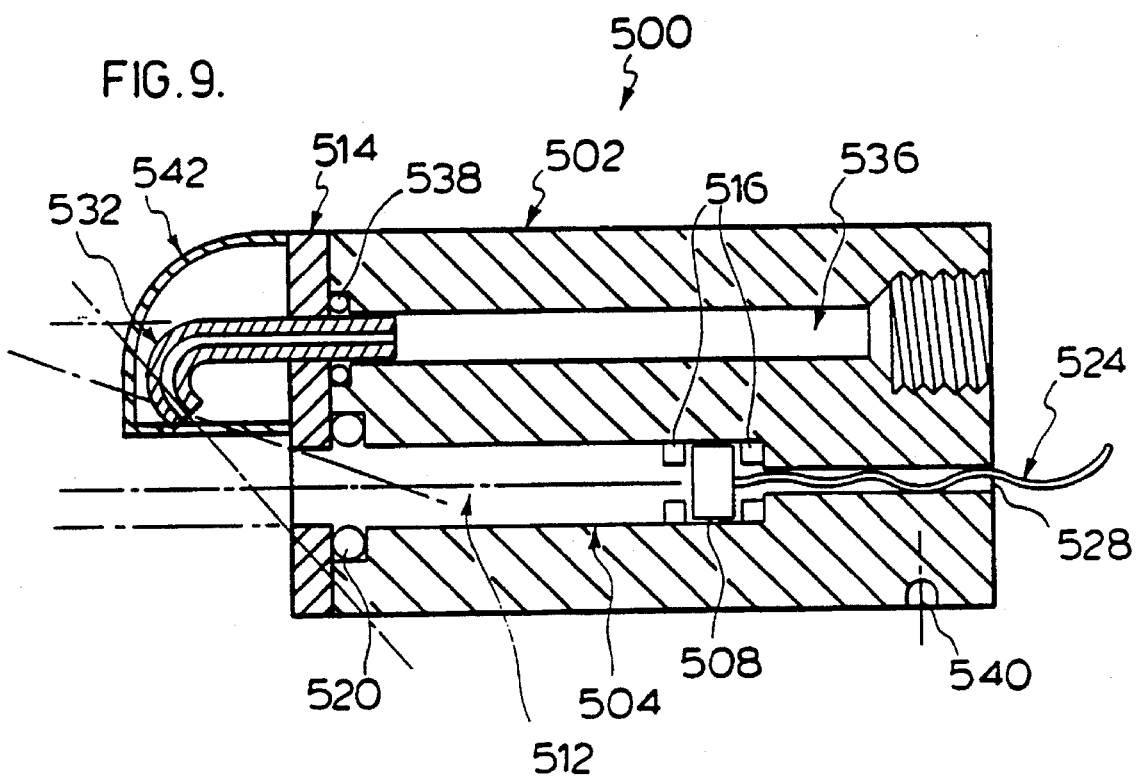
FIG. 9 illustrates a radiation sensor assembly.

FIG. 9 illustrates radiation sensor assembly 500 in accordance with another aspect of the present invention. Sensor assembly 500 includes a cylindrical body 502 in which a bore 504 is formed. A radiation sensor element 508 is located at the interior wall of bore 504 adjacent to a rod 512 which is radiation transmissive and which extends from a front face plate 5 14 attached to body 502. Sensor element 508 is hermetically sealed from fluid by O-rings 516 which are adjacent sensor element 508 and by O-ring 520 which surrounds rod 512 at the connection point between front face plate 514 and body 502. The electrical leads 524 from sensor element 508 exit the rear of body 502 through bore 528.

Since the exposed end of rod 512 will become fouled over time, face plate 514 also includes a cleaning jet 532. Cleaning jet 532 is hermetically connected to bore 536 with O-ring 538, through body 502, which is in turn connected to a supply of pressurized cleaning fluid (not shown) such as an acidic solution, water or air.

When pressurized cleaning fluid is pumped applied to bore 536, cleaning jet 532 directs the cleaning fluid onto the exposed surfaces of rod 512 to remove fouling materials. To prevent damage to cleaning jet 532, rod 512 and to streamline fluid flow, a shroud is also provided.

Radiation sensor assembly 500 may be mounted in a sleeve connected to the treatment zone of a fluid treatment system as will be apparent to those of skill in the art. Radiation sensor assembly 500 can be maintained within such a sleeve by a set screw (not shown) which is received in keyway 540. Of course, as is known by those of skill in the art, for accurate results it is desired that rod 512 be orientated substantially perpendicular to the radiation sources 180 being monitored.

It is contemplated that in normal use, radiation sensor assembly 500 will be cleaned by supplying a predetermined amount of cleaning solution or water at predefined time intervals, to cleaning jet 532.

It should be understood that, while exemplary embodiments of the present invention have been described herein, the present invention is not limited to these exemplary embodiments and that variations and other alternatives may occur to those of skill in the art without departing from the intended scope of the invention as defined by the attached claims.

What is claimed is:

1. A gravity fed fluid treatment system comprising a fluid inlet, a fluid outlet, an irradiation zone disposed between the fluid inlet and fluid outlet, and at least one radiation source assembly comprising at least one radiation source and a support therefor, the at least one radiation source being elongate and having a longitudinal axis substantially parallel to the direction of fluid flow through the irradiation zone and being fully submersed in fluid flow through the irradiation zone, the support being disposed upstream or downstream of the irradiation zone, the irradiation zone having a closed cross-section to confine fluid to be treated within a predefined maximum distance from the at least one radiation source, said closed cross-section being less than a cross-section of said fluid inlet.

2. A system according to claim 1, wherein said support has a longitudinal axis which is disposed in the fluid inlet substantially perpendicular to the fluid flow.

3. A fluid treatment system according to claim 1 wherein the cross-sectional area of said irradiation zone is less than the cross-sectional area of said fluid inlet and the cross-sectional area of said fluid outlet.

4. A fluid treatment system according to claim 3 wherein the cross-sectional area of said irradiation zone is less than the cross-sectional area of the fluid inlet and said irradiation zone is disposed in a treatment zone including a transition region connecting said fluid inlet to said irradiation zone, said transition region reducing pressure loss in said fluid between said inlet and said irradiation zone.

5. A fluid treatment system according to claim 3 wherein the cross-sectional area of said irradiation zone is less than the cross-sectional area of the fluid outlet and said irradiation zone is disposed in a treatment zone including a transition region connecting said fluid outlet to said irradiation zone, said transition region reducing pressure loss in said fluid between said outlet and said irradiation zone.

6. A fluid treatment system according to claim 2 wherein the cross-sectional area of said irradiation zone is less than the cross-sectional areas of said fluid inlet and said fluid outlet, said irradiation zone being disposed in a treatment zone including first and second transition regions, said first transition region connecting said fluid inlet to said irradiation zone and said second transition region connecting said irradiation zone to said fluid outlet, said first and second transition regions reducing pressure loss in said fluid between said fluid inlet and said irradiation zone and between said irradiation zone and said fluid outlet, respectively.

7. A fluid treatment system according to claim 6 wherein said at least one radiation source assembly comprises at least one ultraviolet lamp and a support therefor.

8. A fluid treatment system according to claim 7 wherein said radiation source assembly includes a sleeve about a portion of the exterior of each of said at least one ultraviolet lamp.

9. A fluid treatment system according to claim 6 wherein said longitudinal axis is substantially vertical and said first transition region alters a substantially horizontal fluid flow through said fluid inlet to a substantially vertical fluid flow through said irradiation zone.

10. A fluid treatment system according to claim 9 wherein said second transition region alters said substantially vertical fluid flow through said first irradiation zone to a substantially horizontal fluid flow through said fluid outlet.

11. A fluid treatment system according to claim 7 wherein said longitudinal axis is substantially horizontal.

12. A fluid treatment system according to claim 1 further including cleaning means to remove undesired materials from the exterior of said at least one radiation source assembly.

13. A fluid treatment system according to claim 12 wherein said cleaning means comprises a cleaning sleeve surrounding said at least one radiation source assembly, said cleaning sleeve being movable between a retracted position wherein a first portion of said at least one radiation source assembly is exposed to said fluid flow and an extended position wherein said first portion of said at least one radiation source is covered by said cleaning sleeve.

14. A fluid treatment system according to claim 13 wherein said cleaning sleeve includes a chamber surrounding and in contact with the exterior of said at least one radiation source assembly, said chamber being supplied with a cleaning solution suitable to remove undesired materials from the exterior of said at least one radiation source assembly.

15. A fluid treatment system according to claim 14 wherein said cleaning sleeve includes a seal between the exterior surface of said at least one radiation source assembly and said cleaning sleeve, said seal removing a portion of said undesired materials from the exterior of said at least one radiation source assembly when said cleaning sleeve is moved between said retracted and extended positions.

16. A fluid treatment system according to claim 14 wherein said supply of said cleaning solution is pressurized to said cleaning sleeve and said cleaning sleeve is extended to said extended position by said pressure.

17. A fluid treatment system according to claim 16 wherein said cleaning sleeve is retracted to said retracted position by the removal of said pressurized cleaning solution from said cleaning sleeve.

18. A fluid treatment system according to claim 6 including a first radiation source assembly located upstream of and extending into said irradiation zone and a second radiation source assembly located downstream of and extending into said irradiation zone.

19. A radiation source module for use in a fluid treatment system comprising:

a first support member;

at least one radiation source assembly extending from said first support member; and a second support member extending from said first support member;

wherein said at least one radiation source assembly extends from said first support member substantially parallel to said second member, said second support member extending from said first support member and having a free end to affix the radiation source module in the fluid treatment system.

20. A radiation source module according to claim 19 wherein said second support member extends from said first support member to a greater extent than said at least one radiation source assembly.

21. A radiation source module according to claim 19 wherein said at least one radiation source assembly comprises an ultraviolet source.

22. A radiation source module according to claim 20 wherein said radiation source assembly further comprises a sleeve about said ultraviolet source to provide an insulating gap between said ultraviolet source and fluid passing therearound.

23. A radiation source module according to claim 19 wherein said support member includes conduit means through which an electrical power supply is provided to said radiation source assembly.

24. A radiation source module according to claim 21 wherein at least two of said ultraviolet sources are connected to each first support member.

25. A cleaning apparatus for a radiation source assembly in a fluid treatment system, comprising:

a cleaning sleeve engaging a portion of the exterior said radiation source assembly and movable between a retracted position wherein a first portion of said radiation source is exposed to a flow of fluid to be treated and an extended position wherein said first portion of said radiation source assembly is completely or partially covered by said cleaning sleeve, said cleaning sleeve including a chamber in contact with said first portion of said radiation source assembly and being supplied with a cleaning solution suitable to remove undesired materials from said first portion.

26. A cleaning apparatus according to claim 25 further comprising at least one seal between the exterior surface of said radiation source assembly and said cleaning sleeve, said at least one seal removing a portion of said undesired materials from the exterior of said radiation source assembly when said cleaning sleeve is moved between said retracted and extended positions.

27. A cleaning apparatus according to claim 25 wherein said supply of said cleaning solution is pressurized to said cleaning sleeve.

28. A cleaning apparatus according to claim 27 wherein said cleaning sleeve is retracted to said retracted position by the removal of said pressurized cleaning solution from said cleaning sleeve.

29. A cleaning apparatus according to claim 25 wherein said cleaning sleeve engages a portion the exterior of at least two radiation source assemblies.

30. A cleaning apparatus according to claim 29 wherein said cleaning sleeve is connected to at least one means to move said cleaning sleeve between said retracted and extended positions.

31. A cleaning apparatus according to claim 30 wherein said at least one means to move is hydraulically operated.

32. A cleaning apparatus according to claim 30 wherein said at least one means to move is pneumatically operated.

33. A method of treating a fluid with at least one radiation source assembly comprising at least one radiation source and a support therefor, the method comprising the steps of:

(i) providing a gravity fed flow of fluid from a fluid inlet to a fluid outlet, an irradiation zone being disposed between said inlet and said outlet;

(ii) disposing the at least one radiation source assembly within said irradiation zone such that the at least one radiation source has a longitudinal axis which is substantially parallel to the flow of fluid and the support is upstream or downstream of the irradiation zone;

(iii) confining the flow of fluid such that it is within a predefined maximum distance from and fully submerses the at least one radiation source, said confining source including the step of confining the flow of fluid in a closed cross-section which is smaller than a cross-section of the fluid inlet;

(iv) exposing the flow of fluid to radiation from the radiation source; and (v) feeding the flow of fluid from step (iv) to a fluid outlet.

34. A method according to claim 33, wherein said disposing step includes the step of disposing the radiation source assembly support such that its longitudinal axis is disposed in the fluid inlet and is substantially perpendicular to the fluid flow.

35. A method according to claim 33 wherein the flow of fluid is at a first velocity in said fluid inlet, a second velocity in said irradiation zone and a third velocity in said fluid outlet.

36. A method according to claim 35 wherein said second velocity is greater than at least one of said first velocity and said third velocity.

37. A method according to claim 35 wherein said second velocity is greater than both of said first velocity and said third velocity.

38. A method according to claim 37 wherein said third velocity is substantially equal to said first velocity.

39. A method according to claim 37 wherein prior to step (ii), the fluid flow is admired to a transition zone which increases the velocity thereof.

40. A method according to claim 37 wherein prior to step (v), the fluid flow is admitted to a transition zone which decreases the velocity thereof.

41. A method of removal of fouling materials from a radiation source in situ in a fluid treatment system using a cleaning apparatus comprising a cleaning sleeve engaging a portion of the exterior said radiation source assembly and movable between a retracted position wherein a first portion of said radiation source is exposed to a flow of fluid to be treated and an extended position wherein said first portion of said radiation source assembly is completely or partially covered by said cleaning sleeve, said cleaning sleeve including a chamber in contact with said first portion of said radiation source assembly, comprising the steps of:

(i) providing a supply of a cleaning fluid to a cleaning chamber;

(ii) moving said cleaning chamber to said extended position;

(iii) maintaining said cleaning fluid in contact with said portion;

(iv) allowing said cleaning fluid to facilitate removal of fouling materials from the radiation source; and (v) moving said cleaning chamber to said retracted position.

42. A method according to claim 41 wherein said cleaning chamber includes a seal member in slidable engagement with said portion and sweeping said portion to further remove fouling materials when said cleaning chamber is moved to at least one of said extended position and said retracted position.

43. A method according to claim 41 wherein said cleaning chamber simultaneously contacts a like portion of at least two radiation sources.

44. A method according to claim 41 wherein said cleaning chamber is substantially continuously pressurized by said cleaning fluid and contains inward spray means to remove the fouling materials from the radiation source.

45. A method according to claim 41 wherein said cleaning chamber is kept stationary and the radiation source is moved relative thereto to remove the fouling materials from the radiation source.

46. A method according to claim 41 wherein said cleaning chamber further comprises scouring means to increase rubbing against said radiation source while in contact with the cleaning chamber.

* * * * *